United States Patent

Goble

[15] 3,656,598
[45] Apr. 18, 1972

[54] AUTOMATIC CLUTCH WITH LOCKING MEANS

[72] Inventor: Ralph W. Goble, Boulder, Colo.
[73] Assignee: Autometrics Co., Boulder, Colo.
[22] Filed: Aug. 28, 1970
[21] Appl. No.: 67,833

[52] U.S. Cl. ................................192/35, 192/50, 192/67 R, 192/71, 192/114
[51] Int. Cl. ....................................F16d 11/00, F16d 41/04
[58] Field of Search .................192/35, 36, 50, 67 R, 71, 114

[56] References Cited

UNITED STATES PATENTS

| | | |
|---|---|---|
| 910,456 | 1/1909 | Brush.......................................192/50 |
| 2,531,819 | 11/1950 | Lewis.......................................192/50 |
| 3,055,471 | 9/1962 | Warn et al..........................192/35 UX |
| 3,463,280 | 8/1969 | Hoffman et al. ......................192/35 X |
| 3,472,349 | 10/1969 | Ainsworth ..............................192/35 |
| 3,217,847 | 11/1965 | Petrak.....................................192/67 X |
| 3,240,304 | 3/1966 | Wickersham........................192/67 X |

*Primary Examiner*—Allan D. Herrmann
*Attorney*—Anderson, Spangler & Wymore

[57] ABSTRACT

Reversible clutch which engages and locks a driving member and a driven member upon relative movement between the driven member and another member and which disengages in the absence of relative movement between the driving member and the other member.

22 Claims, 26 Drawing Figures

INVENTOR.
RALPH W. GOBLE

INVENTOR.
RALPH W. GOBLE

INVENTOR.
RALPH W. GOBLE

INVENTOR.
RALPH W. GOBLE
BY
Anderson, Spangler & Wymore

INVENTOR.
RALPH W. GOBLE

INVENTOR.
RALPH W. GOBLE

AUTOMATIC CLUTCH WITH LOCKING MEANS

There is an important need in any machine and automotive applications for an automatic clutch between drive and driven parts to provide for selective engagement therebetween when power is applied to the drive parts. It is desirable that the clutch not only be automatic but quickly responsive to the application of the power to the drive parts in a manner to provide effective engagement with the driven parts and to maintain engagement as long as power is applied and then automatically and positively disengage when the power is no longer applied. For example, the front drive axle of a four-wheel drive vehicle should be connected to the front wheels only when power is applied through the front gear differential to rotate the axle. When the propeller shaft and front gear differential are disengaged, it is desirable to disconnect the wheels from the drive axle to avoid forced rotation of the driving parts forwardly of the shift mechanism and the gear box. If not so disconnected, the forced rotation will cause unnecessary wear and tear on the front drive train with increased noise in operation and possible damage to the driving parts.

Various clutch mechanisms have been used previously between the front drive axle and wheels to permit the operator to manually disengage the drive axle from the wheels so they will rotate independent of the front drive system. In general, free-wheeling clutches of the automatic type depend for engagement or disengagement of the front wheel drive system and are not fully automatic. As an example, the overrunning clutch normally will effect engagement between the front drive axle and wheel whenever the axle speed exceeds the rotational speed of the wheel. In certain instances, it may be desirable to maintain the wheel engaged or disengaged regardless of the relative rotational speeds as in descending an incline. The overrunning clutch will automatically disengage when the wheel speed exceeds the axle speed and does not provide the desired braking action. Thus, with the type of automatic clutches presently available it is necessary to provide some manual means of engagement and disengagement for a condition not subject to control of a driver.

In accordance with the present invention there is provided a fully automatic clutch which will engage when the drive axle is engaged for rotary movement and is being rotated relative to a normally stationary part of the suspension system of the vehicle. Further, the clutch of this invention will be disengaged whenever there is an absence of relative movement between the drive axle and the normally stationary part of the suspension system. The disengaged or engaged condition is thus selectively maintained regardless of driving conditions or relative rotation between the wheel and axle and is always under the immediate control of the driver as a function of engagement of the gear train through the gear box.

It is the principal objective of the present invention to provide a fully automatic clutch for the engagement and disengagement between drive and driven parts as a function of imparting movement as by applying drive power to the drive member.

It is another important object of the present invention to provide an improved fully automatic reversible clutch which will effect engagement and release for driving the driven member in either direction independently of the driving conditions and relative speeds of rotation of the drive and driven parts.

A further object of the present invention is to provide an improved automatic clutch which is self-indexing for engagement of the drive and driven parts regardless of the relative positions at the time engagement is required.

A further important object of the present invention is to provide an improved automatic clutch which not only will positively engage the drive and driven parts on command but will also positively disengage on command.

A further object of the present invention is to provide an improved automatic clutch which has a minimum number of moving parts, is of simple construction and is economical to manufacture and in addition, provides a clutch suitable for use on all four-wheel vehicles.

For a better understanding of the present invention, together with other and further objects thereof, reference is had to the following description taken in connection with the accompanying drawings and its scope will be pointed out in the appended claims.

Referring now to the drawings and in particular FIGS. 1–8, there is shown a wheel assembly 10 of a four-wheel drive vehicle. The hub 12 of this invention is seen to control the engagement and release between the front driving axle shaft 14 and a spaced outer concentric wheel 16. The front axle has a splined outer portion 18 and is journalled within a stationary axle housing 20. The wheel 16 is independently mounted for rotation with respect to the axle housing by bearings 22 in accordance with general practice.

Figure 1:
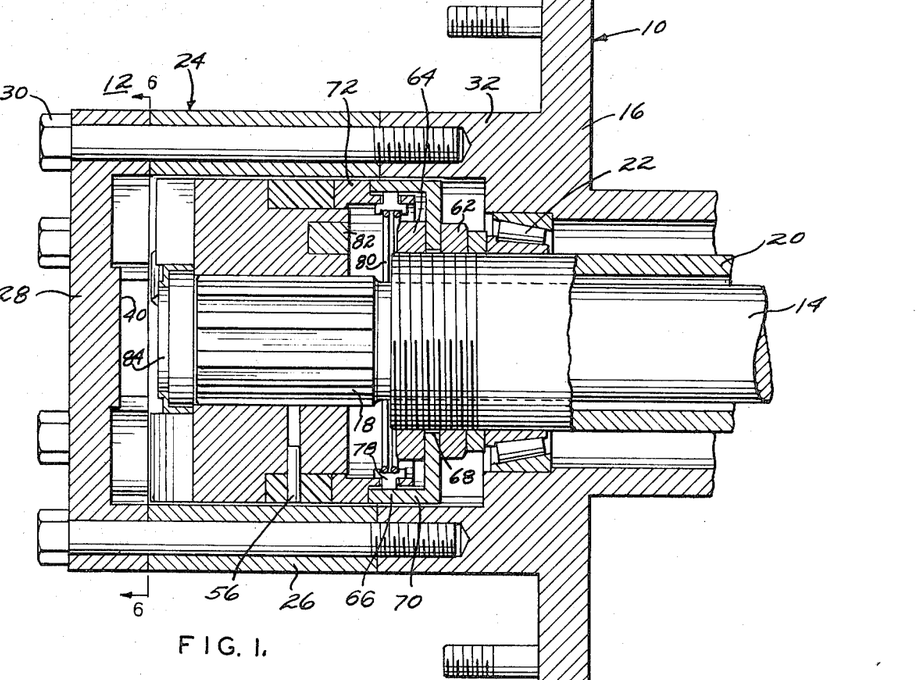
FIG. 1 is a view in elevation of a preferred form of the hub according to this invention with portions broken away to conserve space and portions in cross section to show internal details.
Figure 2:
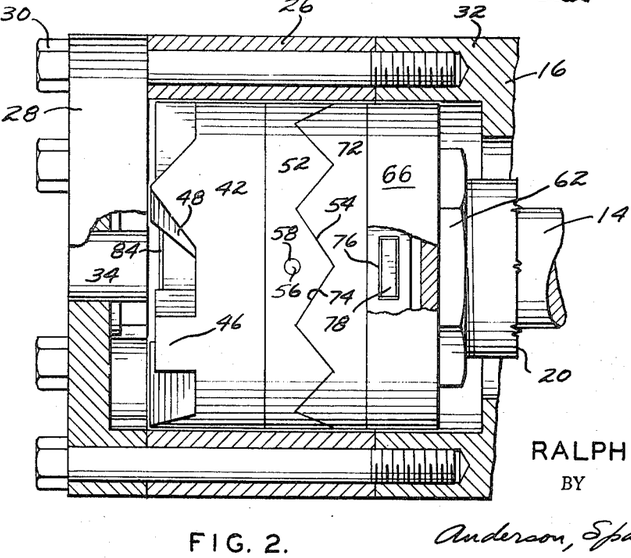
FIG. 2 is a further view in elevation with other portions broken away and shown in cross section for detail.

A cover assembly 24 projects outwardly from the wheel 16 formed of a relatively thick, hollow cylindrical casing 26 with a circular end plate 28 at one end with bolts 30 securing same to the wheel 16 by means of the flange 32.

Figure 6:
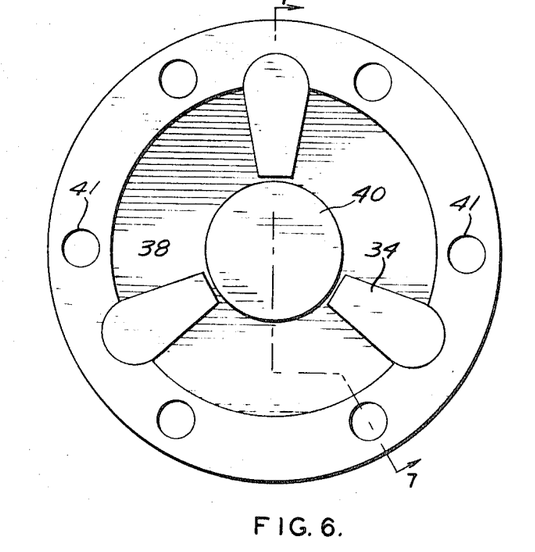
FIG. 6 is an end view of the driven member of the hub, taken along line 6—6 of FIG. 1.
Figure 7:
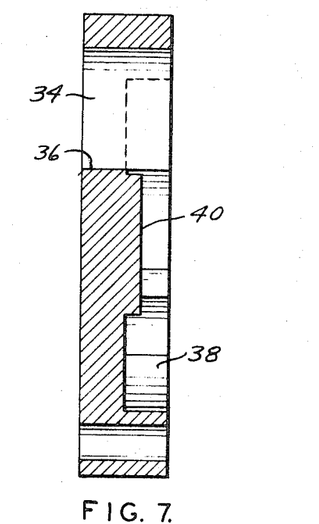
FIG. 7 is a view along line 7—7 of FIG. 6.
Figure 8:
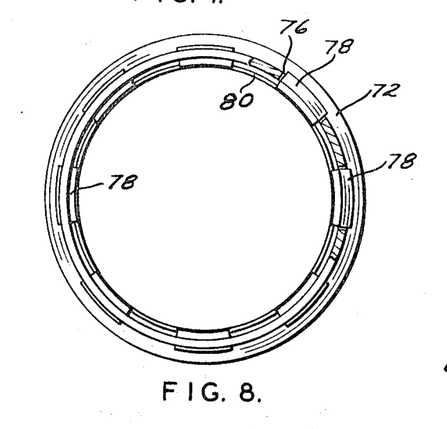
FIG. 8 is a rear elevational view of the spindle cam of the hub.

The end plate 28, FIG. 6, is seen to have on the inner surface thereof a series of radially aligned lugs 34 which are a hardened steel and inserted into a broached opening 36 through end plate 28. End plate is also provided with an annular recess 38 with a center projection 40 of less height than the lugs 34. A plurality of holes 41 are provided about peripheral extremity of the end plate to receive bolts 30 to secure same to the hub assembly. The end plate 28 defines the driven locking element of the clutch and, as will be described, enables positive engagement between the drive axle and driven wheel regardless of the direction of rotation of the drive axle.

Figures 3, 4, 5:
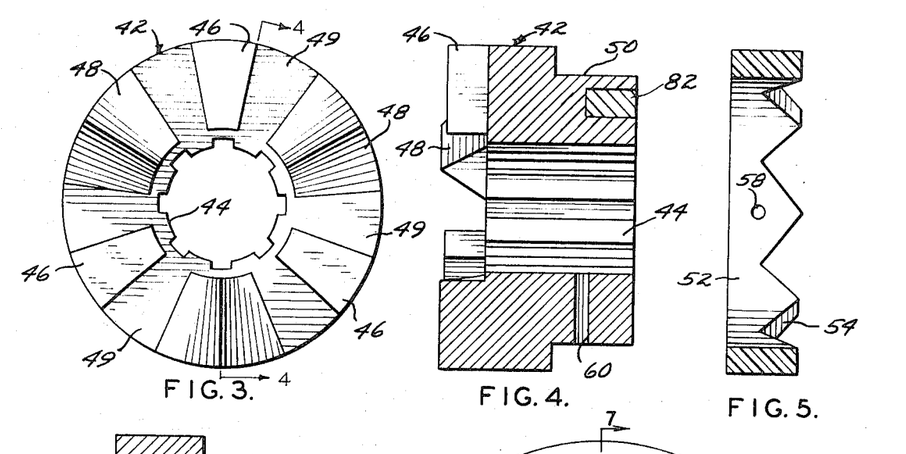
FIG. 3 is a left-hand end view of the drive member of the hub of FIG. 1.
FIG. 4 is a view along line 4—4 of FIG. 3.
FIG. 5 is a side view in cross section of the drive cam of the hub.

The drive or second locking member, engageable with the driven or first locking element formed by end plate 28, is preferably in the form of a drive clutch 42 as best seen in FIGS. 3, 4 and 5. The drive clutch is provided with a central splined opening 44 therein adapted to be received in axially slidable relation on the splined end 18 of axle 14. The end of the clutch positioned in opposed relation to the lugs of end plate 28 is provided with a plurality of lug projections 46 radially positioned thereon. As shown there are three lugs 46, equal in number to the lugs 34 on end plate 28. Positioned between lugs 46 are an equal number of pyramidal cam surfaces 48 but spaced from each lug by a distance at least equal to the width of the projecting lugs 34 of end plate 28 to provide a space 49 such that the lugs 34 may be accommodated between the lugs 46 and cam surfaces 48 when the end plate and the drive clutch are in the engaged position. The rear of the drive clutch 42 is provided with a portion 50 of reduced diameter of a dimension to receive a cam ring 52 of a low friction material such as molybdenum disulfide loaded nylon. The cam ring 52 is provided with a plurality of triangular shaped cam surfaces 54 along the rear edge and the ring is secured to the drive cam by means of pins 56 press fit into holes 58 in ring 52 and alinged holes 60 in drive cam 42.

Figure 19:
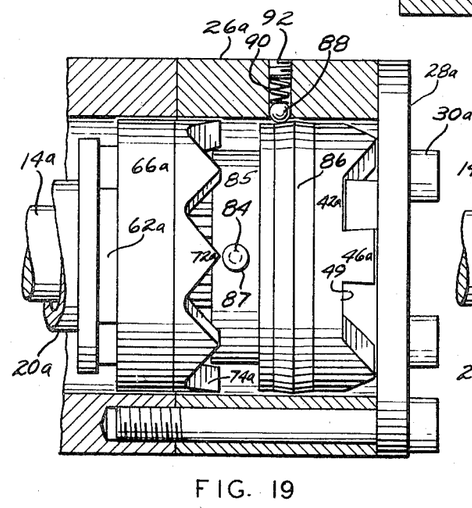
FIG. 19 is a view in elevation to an enlarged scale of the hub of FIG. 18 partly in section and partly broken away showing the clutch elements engaged.
Figure 20:
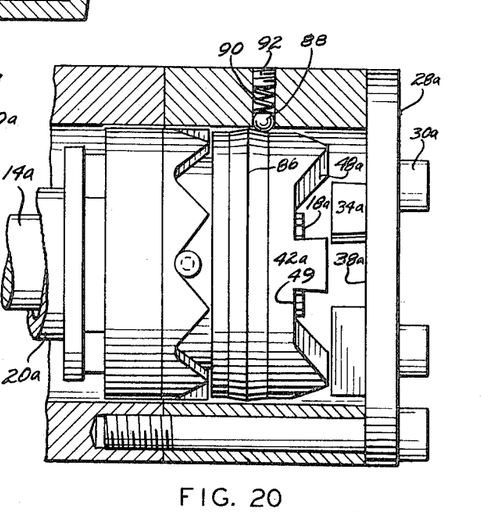
FIG. 20 is a view in elevation to an enlarged scale of the hub of FIG. 18 partly in section and partly broken away showing the clutch elements disengaged.
Figure 21:
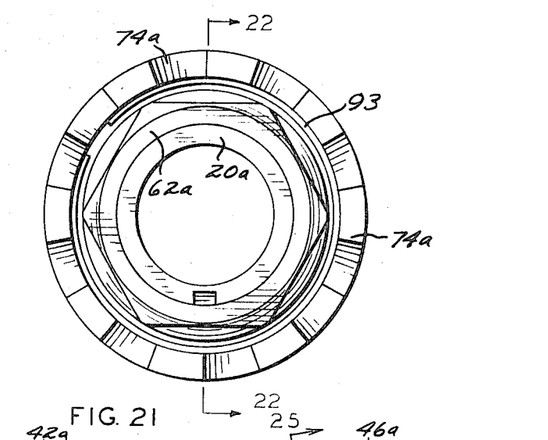
FIG. 21 is a frontal view of the spindle cam of the hub of FIG. 18.

The end of axle housing 20 is threaded to receive nuts 62 and 64 having clamped therebetween a cup shaped friction collar 66, with housing 20 passing through a hole 68 in the bottom and the side walls 70 thereof extend toward the end plate 28. A spindle cam 72, FIG. 8, in the form of a cylindrical sleeve has a plurality of triangular shaped cam surfaces 74 forming a first actuating member which mate with surfaces 54 on cam ring 52 forming a second actuating member. Spindle cam 72 is relatively fixed to axle housing 20 by means of frictional engagement therebetween and friction collar 66. Spindle cam 72 in a reduced outside diameter portion has a plurality of apertures 76 therein in spaced radial fashion. Each aperture has a friction element 78 positioned therein and biased outwardly against the internal diameter of friction collar 66 by means of circular springs 80. Thus spindle cam 72 will move with respect to axle housing 20 only with great difficulty such that whenever axle 14 is rotated with respect to housing 20 the cam surfaces 54 and 74 cause the drive clutch 42 to be displaced along the axis of the axle toward end plate 28. The lug projections 46 on the driving clutch 42 are forced by the camming action of spindle cam 72 and cam ring 52 into the recess 38 to either side of a lug 34 of end plate 28. Where the direction of rotation of shaft 14 reverses or stops the continued rotation of end plate 28 causes lugs 34 to engage cam surfaces 48 forming the third actuating member on driving clutch 42 moving same axially away from end plate 28 to disengage the locking lugs 34 of end plate 28 from locking lugs 46 of driving clutch 42. If in the movement of driving clutch 42 away from end plate 28, the cam surfaces 54 and 74 do not mesh due to misalignment, the spindle cam 72 will rotate with respect to the friction collar 66 against the action of friction elements 78 until alignment is achieved and driving clutch 42 is fully retracted, releasing end plate 28. If there is continued reverse relative rotation between shaft 14 and end plate 28, the cam surfaces 54 and 74 will again move the drive clutch 42 axially into locking engagement with the locking means 46 of end plate 28. The cam surfaces 54, 74 and 48 are symmetrical to provide engagement and disengagement in either direction of relative rotation. A detent or holding means is provided to maintain the axially movable driving clutch 42 at either end of its travel, either in engaged or unengaged condition. The holding means may take several forms. One form is the provision of a plurality of magnets 82 inserted around the end thereof away from end plate 28 and a circular magnet 84 pressed into the splined opening 44 therein at the end adjacent end plate 28. The magnets 82 and 84 thus act on the metal mass at either end of travel of drive clutch 42 to hold the clutch at either end of its axial travel. The detent may also comprise an annular inclined rib 86 as shown in FIGS. 19 and 20 with a ball 88 inserted into a radial bore in the side wall of cylindrical casing 26a with the ball being spring loaded by a spring 90 held in place by a cap screw 92. As the driving clutch 42a is moved axially with respect to shaft 14a the ball acts on the down slope of inclined rib 86 to hold the driving clutch in one extreme axial position or the other.

Referring now to FIGS. 18–26 there is shown another embodiment of a clutch according to the invention fitted into a wheeled assembly 109 of a four-wheel drive vehicle. The hub 12a is positioned to provide selective engagement between the front axle driving shaft and wheel 16a. The front axle has a splined outer portion 18a and is journalled within a stationary axle housing 20a. The wheel 16a is independently mounted for rotation with respect to the axle housing by bearings 22a as is common practice.

Figure 18:
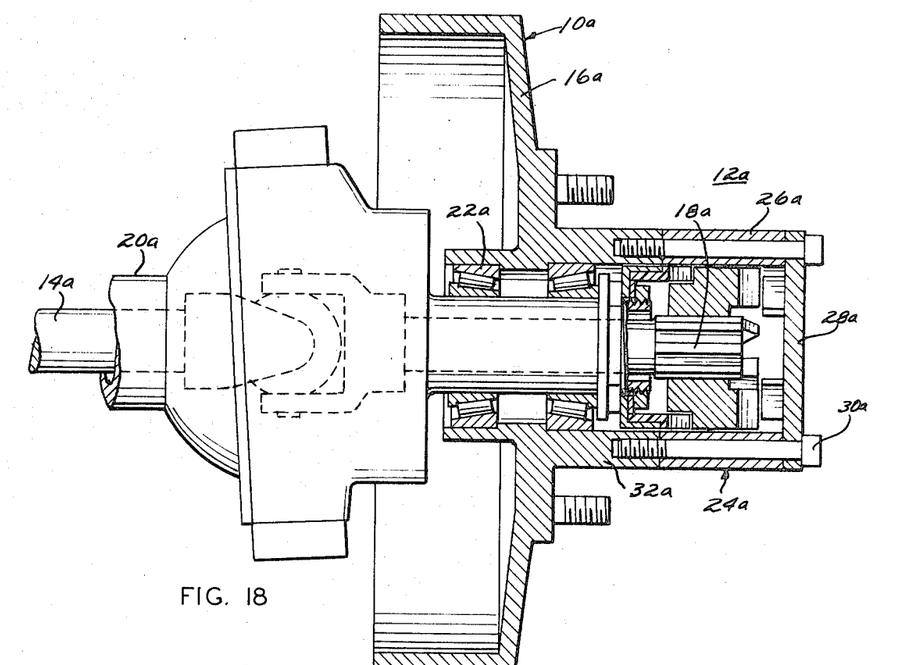
FIG. 18 is a view in elevation of still another embodiment of the invention partly in section and partly broken away.

A cover assembly 24a projects outwardly from the wheel 16a formed of a relatively thick, hollow cylindrical casing 26a having a circular end plate 28a at one end and bolts securing same and casing 26a to the wheel 16a by means of flange 32a.

Figure 26:
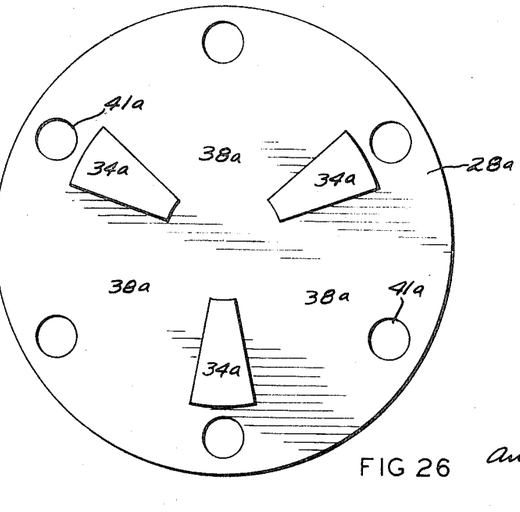

The end plate 28a, FIG. 26, is seen to have on the interior surface thereof a series of radially aligned lugs 34a which may be cut into the end plate or welded thereto in a well-known manner. As seen there is an annular extending recess 38a between each lug 34a. A plurality of holes 41a are provided about the peripheral extremity of the end plate to receive bolts 30a to secure same to the hub assembly. The end plate 28a constitutes the driven or first locking element of the clutch and enables the establishment of positive engagement between the drive axle and driven wheel regardless of the driving conditions or the direction of rotation of the drive axle.

Figures 23, 25:
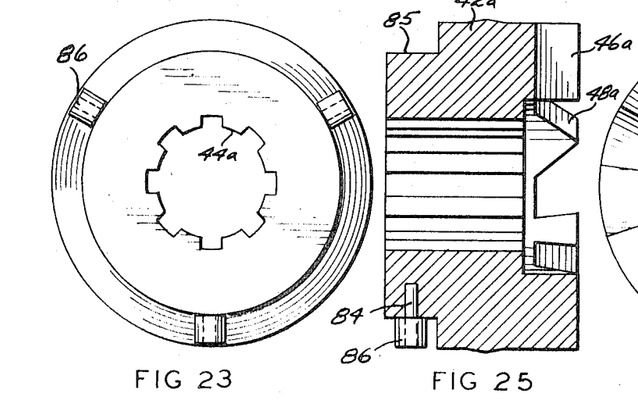
FIG. 23 is a rear view of the drive element of the hub of FIG. 18.
FIG. 25 is a side view to an enlarged scale, partly broken away and partly in section of the drive element; and, FIG. 26 is a view of the driven element of the hub of FIG. 18.
Figure 24:
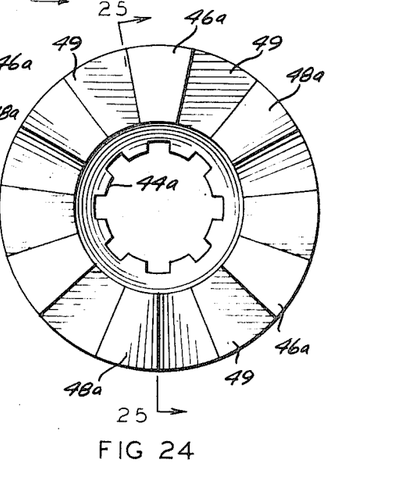
FIG. 24 is a front view of the drive element.

The drive or second locking member, engageable with the driven or first locking element formed by end plate 28a, is preferably in the form of a drive clutch 42a as best seen in FIGS. 23–25. The drive clutch 42a is provided with a central splined opening 44a therein adapted to be received on the splined portion 18a of axial 14a. The end of the clutch positioned in opposed relation to the lugs of end plate 28a is provided with a plurality of lug projections 46a, equal in number to the lugs 34a on end plate 28a. Positioned between lugs 46a are an equal number of pyramidal cam surfaces 48a but spaced from each lug by a distance at least equal to the width of the lugs 34a of end plate 28a to provide a space 49a such that the lugs 34a may be accommodated between the lugs 46a and cam surfaces 48a when the end plate 28a and drive clutch 42a are in the engaged condition, FIG. 19. The rear of the drive clutch 42a is provided with a portion 85 of reduced diameter and a plurality of pins 84 are positioned about reduced diameter portion 50a in radially spaced relation and receive a bearing 86 for the purpose to be described.

Figure 22:
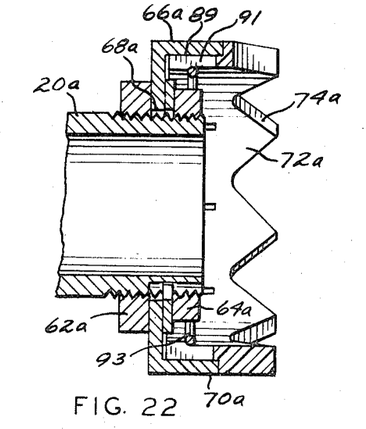
FIG. 22 is a view along line 22—22 of FIG. 21.

The end of axle housing 20a is threaded to receive nuts 62a and 64a, FIG. 22, having clamped therebetween a cup shaped friction collar 66a with housing 20a passing through a hole 68a in the bottom and the side walls 70a thereof extending toward the end plate 28a. A spindle cam 72a, in the form of a cylindrical sleeve has a plurality of triangular shaped cam surfaces 74a forming a first actuating member which receive and mate with bearings 86 on drive clutch 42a forming a second actuating member. Spindle cam has a reduced portion 89 having axial slots 91 therein and the reduced portion is adapted to be received within the side walls 70a of friction collar 66a. A circular spring 93 is positioned inside the reduced portion 89 of cam 72a under compression and combine with the slots 91 in the cam to frictionally restrict relative rotation between the cam 72a and collar 66a. Thus spindle cam 72a will move with respect to axle housing 20a only with great difficulty such that whenever axle 14a is rotated with respect to housing 20a, the cam surfaces 74a and bearings 86 cause the drive clutch 42a to be displaced along the axis of the axle toward end plate 28a. The lug projections 46a on the driving clutch 42a are forced by the camming action of spindle cam 72a and bearings 86 into the recess 38a to either side of a lug 34a of end plate 28a. Where the direction of rotation of shaft 14a reverses or stops, the continued rotation of the end plate 28 causes lugs 34a to engage cam surfaces 48a forming a third actuating member on driving clutch 42a moving same axially away from end plate 28a to disengage the locking lugs 34a of end plate 28a from locking lugs 46a of driving clutch 42a. Continued reverse relative rotation between shaft 14a and end plate 28a will result in the camming surfaces 74a and bearings 86 axially displacing drive clutch 42a axially toward end plate 28a with lugs 46a in locking engagement with lugs 34a. The camming action of cam surfaces 74a and bearings 86 is symmetrical to provide for engagement and disengagement in either direction of relative rotation between axle 14a and axle housing 20a and between axle 14a and end plate 28a. If in the movement of driving clutch 42a away from end plate 28a, the cam surfaces 74a and bearings 86 do not permit complete disengagement due to misalignment, the spindle cam 72a will rotate with respect to the friction collar 66a against the action of spring 93 until alignment is achieved and driving clutch 42a is fully retracted, releasing end plate 28a. Detent means in the form of inclined rib 86 and spring loaded ball 88 may be used to hold the drive clutch 42a in either engaged or disengaged position.

Figure 9:
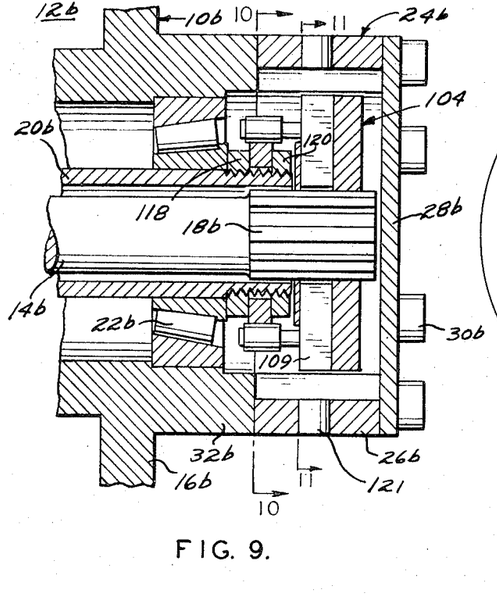
FIG. 9 is a view in elevation partly in section and with portions broken away of another embodiment of a hub according to the invention.
Figure 10:
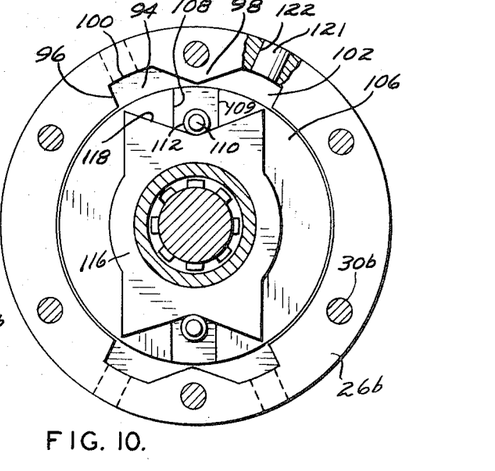
FIG. 10 is a view along line 10—10 of FIG. 9.
Figure 11:
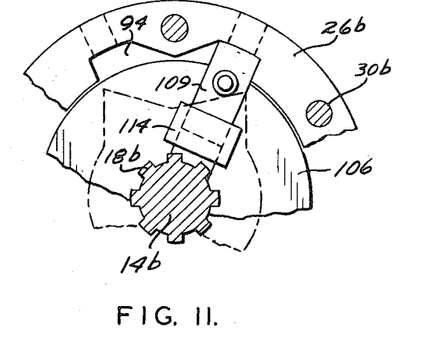
FIG. 11 is a view along line 11—11 of FIG. 9 with portions broken away to conserve space showing the clutch elements engaged.

Referring now to the embodiment of the hub depicted in FIGS. 9 through 11, there is shown a wheel assembly 10b of a four-wheel drive vehicle. The hub 12b controls the engagement and disengagement between the front drive axle shaft 14b and wheel 16b. The front axle has a splined outer portion 18b and is journalled within a stationary axle housing 20b. The wheel 16 is independently mounted for rotation with respect to the axle housings by bearings 22b in accordance with standard practice.

A cover assembly 24b projects outwardly from the wheel 16 formed of a relatively thick, hollow cylindrical casing 26b with a circular end plate 28b at one end and bolts 30b securing same to the wheel 16b by means of the flange 32b.

The cover assembly is provided with a plurality of axially aligned recesses 94 in the inner surface thereof which in cross section across the axis resembles the letter M and constitutes the first locking means. The recess has a radially extending shoulder 96 at each end thereof in a circumferential direction, a V-shaped cam section 98 in the middle and a curved circumferential chord portion 100 defining a space 102 between the shoulder 96 and the V-shaped cam 98.

The drive or second locking member 104 engageable with the driven locking element formed by the cover assembly 24b is in the form of a circular disc 106 having a central splined opening to mate with the splined portion 18b of axle 14b in relatively fixed axial relation. The disc 106 has a slot 108 traversing the face thereof facing the end of axle housing 20b. A pair of lugs 109 are slidably positioned within slot 106 for radial sliding movement. As will be seen in FIG. 9 the lugs 109 have a small rod 110 projecting from the face thereof on which is positioned a cylindrical bearing 112 and a cover 114 for slot 106 is positioned between the disc 106 and the end of the axle housing 20b. The end of axle housing 20b is threaded and a spindle cam 116 is sandwiched in slip fit fashion between nuts 118 and 120 threaded on axle housing 20b. The spindle cam 116 is provided with a V-shaped cam surface 119 forming a first actuating member at either end on which the bearing 112 forming a second actuating member rides. When the axle 14b rotates to axle housing 20b, the bearings 112 ride up the cam surface 119 of spindle cam 116 causing lugs 106 to move into space 102 and engage shoulder 96. When drive is removed from axle 14b the outer end of lug 109 is cammed out of engagement with shoulder 96 by cam 98, a third actuating member, formed in the recess 94 in casing 26b. To insure the holding of lug 109 in engaged position a magnet 121 may be inserted into apertures 122 in the walls of casing 26b in alignment with the position of lug 109 in the engaged condition. If axle 14b is rotated relative to axle housing 20b when the lugs 109 are not opposite a recess 94, then cam 116 will be allowed to rotate with respect to axle housing 20b via the friction slip fit of cam 116 between nuts 118 and 120 until the lugs register with a recess whereupon the lugs 109 are driven into the recesses by the coaction of cam surface 119 upon pin 110 and bearing 112. Again, the camming surfaces of cam 98 and cam surfaces 119 are symmetrical so that on the stopping or continued reversal of relative rotation either between axle 14b and axle housing 20b or between axle 14b and casing 26b, the lugs 109 will move out of locking engagement with one extremity of recess 94 and into reverse locking engagement with the other extremity thereof.

Referring now to FIGS. 12 through 17, a wheel assembly of a four-wheel drive vehicle is shown with a hub 12c of this invention controlling the engagement and disengagement of the drive axle shaft 14c and a wheel 16c. The front axle has a splined outer end 18c and is journalled within a stationary axle housing 20c. The wheel 16c is independently mounted for rotation with respect to the axle housing by means of bearings, not shown, as is common practice.

Figure 12:
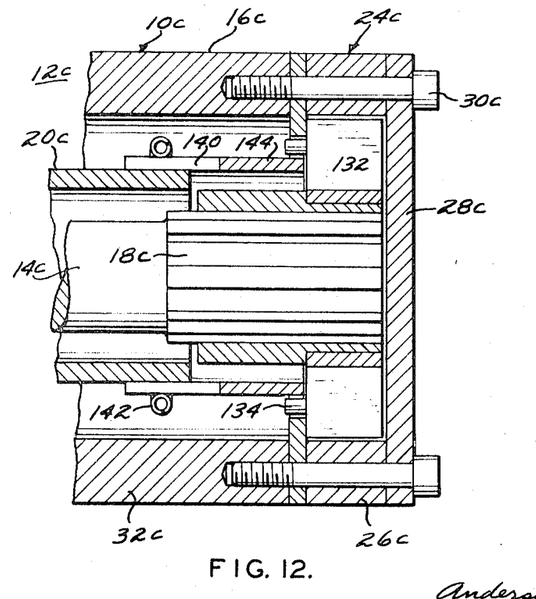
FIG. 12 is a view in elevation partly in section with portions broken away of still another embodiment of the hub according to the invention.
Figure 13:
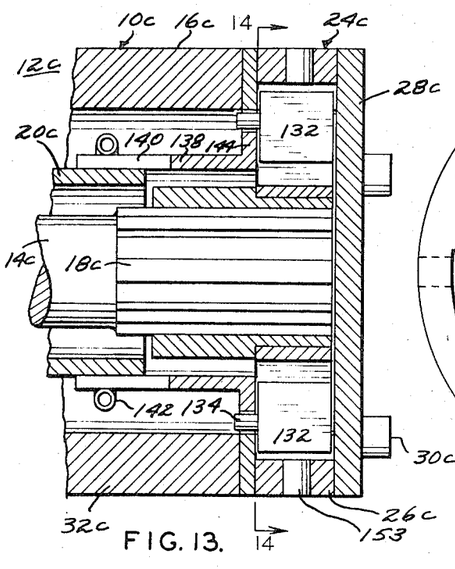
FIG. 13 is a view partly in section with portions broken away of the hub of FIG. 12 with the clutch elements engaged.
Figure 14:
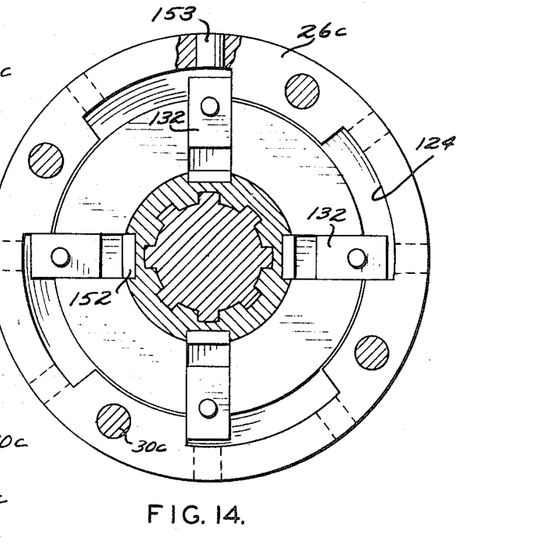
FIG. 14 is a view along line 14—14 of FIG. 13.
Figure 15:
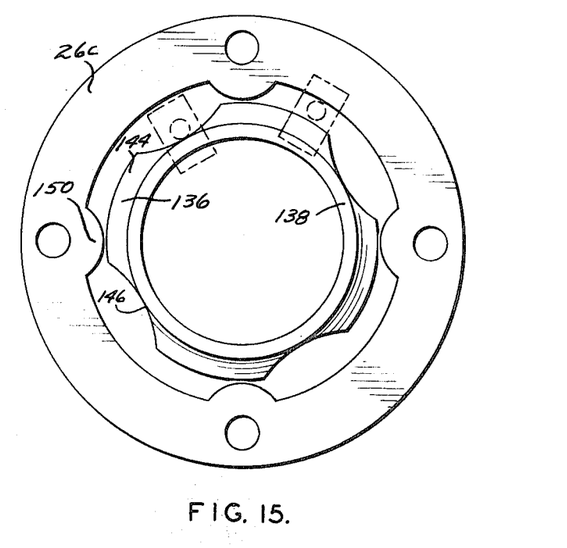
FIG. 15 is a view of the cam elements of the hub of FIGS. 12 and 13.
Figure 16:
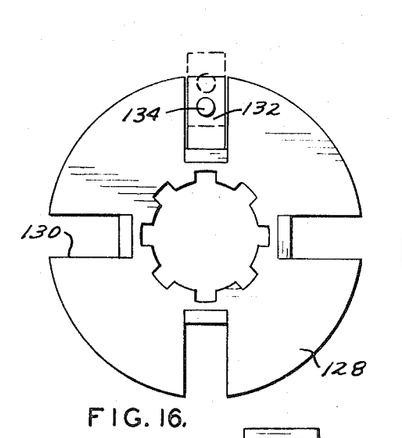
FIG. 16 is a view of the drive element of the hub of FIGS. 12 and 13.
Figure 17:
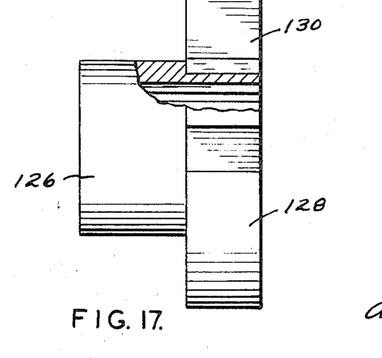
FIG. 17 is a side view of the drive element of the hub of FIGS. 12 and 13 partly in section with a portion broken.

A cover assembly 24c outwardly from the wheel 16c is formed of a relatively thick, hollow cylindrical casing 26c with a circular end plate 28c at one end and bolts 30c securing same to the wheel 16c via flange 32c. The casing 26c, forming a first locking means, is seen to have a plurality of radially extending recesses 124 opening onto the inner diameter thereof and having a substantial circumferential dimension extending over approximately 45° depending upon the number of recesses in the casing. The splined end 18c of axle 14c is provided with an adapter 126 the end of which is splined and receives drive clutch 128, forming a second locking means having a plurality of radial slots 130 therein adapted to receive and receiving lugs 132. Lugs 132 are each provided with a pin 134 extending therefrom away from the end plate 28c. Clutch 128 and adapter could, of course, be one piece or be welded. A spindle cam 136, forming a first actuating member, has a cylindrical portion 138 having axial positioned slots 140 therein received over the end of axle housing 20c in slip fit relation and has a spring 142 which compresses the slotted end of portion 138 to provide increased friction. The end of cam 136 adjacent clutch 128 is provided with a flange 144 having an engage cam surface 146 thereon forming a second actuating member. A disengage cam 148 is positioned between casing 26c and flange 32c and aligned with the flange 144 of cam 136. Disengage cam 148, forming a third actuation member, is provided with a plurality of cams 150 equal in number to the lugs 132 adapted to engage pins 134 to retract lugs 132 from recesses 124. Thus, when the front drive axle 14c is rotated relative to the axle housing 20c, the lugs 132 are caused to move into the recesses by the action of cam surfaces 146 on pins 134 and the lugs 132 engage an extremity of the recesses to drive casing 26c and wheel 16c. On axle 12c stopping, the lugs 132 will be retracted from recesses 124 by action of cams 150 on pins 134 thereof and upon continued reverse relative movement between axle 12c and casing 26c, the symmetry of the camming surfaces 146 and 150 will cause locking lugs 132 to be cammed into locking engagement with the other extremity of recess 124 to provide reverse locking engagement between drive clutch 128 and casing 26c.

If the axle 14c is rotated relative to the axle housing 20c and lugs are unable to enter the recess due to their not being indexed, the cam 136 will slip relative to the axle housing 20c until the lugs are opposite a recess and are then cammed by the action of cam surface 146 against pin 134 into the recesses 124. The center extremities of the slots 130 may be provided with a permanent magnet 152 which serves to hold lugs 132 in retracted position. Centrifugal force may be adequate to hold lugs 132 in extended locked position or permanent magnets 153 may be positioned adjacent to recesses 124 if desired. A magnetic switch, not shown, may be positioned in a manner to provide an indication that the locking means are engaged or disengaged.

What is claimed is:

1. A clutch adaptable for effecting locking engagement between a driving member and a driven member in response to the rotation of the driving member, said clutch comprising a first locking means carried by the driven member, a second locking means being connected for rotation on the driving member and having lug means movable into and out of locking engagement with said first locking means;

a fixed member with said driving member being journalled for rotation with respect thereto;

a first actuating member adapted for restrained movement with respect to the fixed member;

a second actuating member movable in response to relative movement between the driving member and the fixed member to move said lug means of the second locking means into locking engagement with said first locking means; and, a third actuating member having a cam surface adapted upon relative rotation of the driven member and the driving member to cam said lug means of the second locking means out of locking engagement with said first locking means.

2. A clutch according to claim 1 wherein the second locking means is keyed for rotation on the driving member while being free to move axially therealong into rotatable locking engagement with said first locking means.

3. A clutch according to claim 1 wherein the second locking means is keyed for rotation with said driving member and is provided with at least one radially movable lug for radial movement into rotatable locking engagement with said first locking means.

4. The clutch according to claim 1 including holding means for holding the lug means of the second locking means in locked engagement with the first locking means when in locked condition and for holding the lug means of the second locking means out of engagement with the first locking means in unlocked condition.

5. The clutch according to claim 1 wherein the first locking means is provided with radially extending recesses adapted to receive said lugs of said second locking means in locking relation.

6. The clutch according to claim 1 wherein the third actuating means comprises a cam surface on the first locking means.

7. The clutch according to claim 1 wherein the third actuating means comprises a cam surface on the second locking means.

8. The clutch according to claim 1 wherein the third actuating means comprises a cam surface on one of said first and second locking means adapted to coact with a lug on the other of said first and second locking means to move the second locking means out of locking engagement on relative rotary movement of said first and second locking means.

9. The clutch according to claim 1 wherein the first actuating member is operatively coupled to the fixed member by a slip clutch and said first and second actuating members have inter-engaging surface portions therebetween being operative to displace the lug means of said second locking means into locking engagement with the first locking means when torque is applied to the driving member and said third actuating member having a surface portion operatively interacting between the first and second locking means to displace the lug means of said second locking means out of locking engagement with the first locking means when the driven member is rotated relative to the driving member.

10. A clutch adaptable for effecting locking engagement between a driving member and a driven member in response to the rotation of the driving member, said clutch comprising a first locking means carried by the driven member and a second locking means being connected for rotation on the driving member and being axially movable into and out of locking engagement with said first locking means;

a fixed member with said driving member being journalled for rotation with respect thereto;

a first actuating member mounted for restrained relative movement on said fixed members; and, a second actuating member movable in response to relative movement between the driving member and the fixed member, said actuating members having inter-engaging portions being formed to axially displace said second actuating member on rotation thereof away from said first actuating member a sufficient distance to displace said second locking means into rotatable locking engagement with said first locking means, and said first and second locking means having inter-engaging portions being formed to axially displace said second locking means axially away from said first locking means a sufficient distance to move the second locking means out of locking engagement with said first locking means.

11. The clutch according to claim 10 including holding means selectively holding the second locking means in locked engagement with the first locking means when in locked condition and selectively holding the second locking means out of engagement with the first locking means when in unlocked condition.

12. The clutch according to claim 10 wherein the first locking means is provided with radially extending recesses adapted to receive radially extending lugs provided on said second locking means.

13. In a clutch according to claim 10 wherein the inter-engaging portions of said actuating members is defined by a plurality of spaced convex surfaces on one member arranged in complimentary relation to a contact point on the other member whereupon rotation of the second actuating member, the convex surfaces of said one actuating member are forced outwardly along the convex surfaces thereof to cause outward axial displacement of the second locking means toward said first locking means.

14. The clutch according to claim 13 wherein the inter-engaging portions of each actuating member is defined by a plurality of spaced convex surfaces.

15. The clutch according to claim 11 wherein the holding means is a permanent magnet.

16. The clutch according to claim 11 wherein the holding means is a detent comprised of an inclined rib on said second locking means coacting with a spring-loaded ball.

17. The clutch according to claim 10 wherein the second locking means is provided with lug means movable into and out of locking engagement with the first locking means, and the first locking means is provided with radially extending recesses adapted to receive said lugs of said second locking means in locking relation.

18. The clutch of claim 17 wherein the second locking means is provided with lug means comprised of a plurality of radially extending wedge-shaped ribs having sides parallel with the axis of rotation of the drive axle and the first locking means is provided with lug means adapted to intermesh and lock with the lug means of the second locking means and cam means positioned between said lug means adapted on relative rotation of said first and second locking means to axially move said first and second locking out of locking engagement.

19. A clutch for selectively and automatically engaging and disengaging an inner drive axle and an outer concentric rotating wheel in a four-wheel drive vehicle wherein the inner drive axle is mounted for rotation within a stationary axle housing and the drive axle includes a splined end portion projecting outwardly from one end of the axle housing, said clutch comprising a cylindrical drive clutch disposed on the splined end portion of the drive axle, said drive clutch having a locking means comprising a plurality of angularly spaced radially extending wedge-shaped lugs with a space to either side thereof on the end thereof remote of the end of the stationary housing, the other end of the drive clutch is provided with a plurality of cam followers, a cam is positioned in restrained rotatable relation on said fixed axle housing and has convex cam surfaces which act upon the cam followers of said drive clutch upon relative rotation therebetween to provide axial displacement thereof away from the end of the axle housing;

a cover assembly is connected to said wheel for rotation therewith including a locking means comprising an end plate axially aligned with said drive axle and drive clutch, the inner face of the end plate adjacent the splined end of the drive axle being provided with a plurality of angularly spaced radially extending wedge-shaped lugs with a space to either side thereof adapted to receive a lug of said drive clutch therein with a lug of the end plate being received in a space to either side of a lug on said drive clutch, when the drive clutch is displaced axially into locking engagement with the end plate by the action of the convex cam surfaces upon the cam followers, said lugs on one of said drive clutch and said end plate having a pyramidal-shaped convex cam surface positioned therebetween and between the spaces to either side thereof which coact with the radial lugs on the other of said drive clutch and end plate on relative rotation of said drive clutch and said wheel to provide axial displacement of said drive clutch away from end plate out of locking engagement therewith.

20. The clutch according to claim 19 including holding means for holding the drive clutch selectively in either the engaged or disengaged position.

21. The clutch according to claim 10 wherein the holding means is permanent magnets positioned to provide magnetic attraction to that part of the drive clutch most closely adjacent the end plate or the end of the axle housing.

22. The clutch according to claim 20 wherein the holding means comprises detent means acting between said drive clutch and said cover assembly.

* * * * *